US012596354B2

(12) United States Patent
Hashimoto et al.

(10) Patent No.: US 12,596,354 B2
(45) Date of Patent: Apr. 7, 2026

(54) ABNORMALITY INFORMATION ESTIMATION SYSTEM, OPERATION ANALYSIS SYSTEM, MOTOR CONTROL DEVICE, ABNORMALITY INFORMATION ESTIMATION METHOD, AND PROGRAM

(71) Applicant: KABUSHIKI KAISHA YASKAWA DENKI, Kitakyushu (JP)

(72) Inventors: Ayaka Hashimoto, Kitakyushu (JP); Tadashi Okubo, Kitakyushu (JP); Takashi Kitazawa, Kitakyushu (JP); Tsuyoshi Yokoya, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 601 days.

(21) Appl. No.: 18/050,226

(22) Filed: Oct. 27, 2022

(65) Prior Publication Data

US 2023/0140482 A1 May 4, 2023

(30) Foreign Application Priority Data

Oct. 29, 2021 (JP) .................................. 2021-178099

(51) Int. Cl.
*G05B 19/414* (2006.01)
*G05B 19/418* (2006.01)

(52) U.S. Cl.
CPC ..... *G05B 19/4184* (2013.01); *G05B 19/4183* (2013.01); *G05B 19/4188* (2013.01)

(58) Field of Classification Search
CPC ............ G05B 19/4184; G05B 19/4183; G05B 19/4188; G05B 23/024; G05B 23/0262; G05B 2219/24065
See application file for complete search history.

(56) References Cited

U.S. PATENT DOCUMENTS

| | | | |
|---|---|---|---|
| 2017/0242076 A1* | 8/2017 | Yoshiura | G05B 23/0235 |
| 2018/0095454 A1 | 4/2018 | Zhao et al. | |
| 2020/0254671 A1 | 8/2020 | Horiuchi | |
| 2020/0287497 A1* | 9/2020 | Nagata | H02P 23/0018 |
| 2020/0380354 A1* | 12/2020 | Zhao | G06N 3/049 |
| 2023/0137232 A1* | 5/2023 | Goya | G05B 19/4184 |
| | | | 73/865.9 |

(Continued)

FOREIGN PATENT DOCUMENTS

| | | |
|---|---|---|
| CN | 111164526 A | 5/2020 |
| JP | 2007-170815 A | 7/2007 |

(Continued)

OTHER PUBLICATIONS

English translation of Foreign Patent Document JP2018-055552 (Year: 2018).*

(Continued)

*Primary Examiner* — Mi'Schita' Henson

(74) *Attorney, Agent, or Firm* — Oblon, McClelland, Maier & Neustadt, L.L.P.

(57) ABSTRACT

An abnormality information estimation system includes processing circuitry that identifies, based on operation data related to an operation of an industrial device that controls a mechanism, multiple unit phenomena due to the operation, and estimates abnormality information about an abnormality occurring in the mechanism based on the multiple of unit phenomena.

19 Claims, 8 Drawing Sheets

(56) References Cited

U.S. PATENT DOCUMENTS

2023/0251645 A1 *   8/2023   Hu ..................... G05B 19/4062
                                              702/183

FOREIGN PATENT DOCUMENTS

| JP | 2018-55552  | A | 4/2018 |
| JP | 2019-70930  | A | 5/2019 |
| JP | 2020-128013 | A | 8/2020 |
| JP | 2020-153836 | A | 9/2020 |
| JP | 6823576     | B | 2/2021 |

OTHER PUBLICATIONS

Office Action issued Sep. 5, 2023, in corresponding Japanese Patent Application No. 2021-178099 (with English Translation), 6 pages.
Combined Chinese Office Action and Search Report issued Feb. 28, 2025 in Chinese Patent Application No. 202211088988.2 (with English translation), 22 pages.
Combined Office Action and Search Report issued on Sep. 8, 2025, in the corresponding Chinese Patent Application No. 202211088988.2 (with English translation), 28 pages.
Office Action dated Dec. 5, 2025, issued in counterpart CN Application No. 202211088988.2, with English Translation. (25 pages).

* cited by examiner

FIG. 3

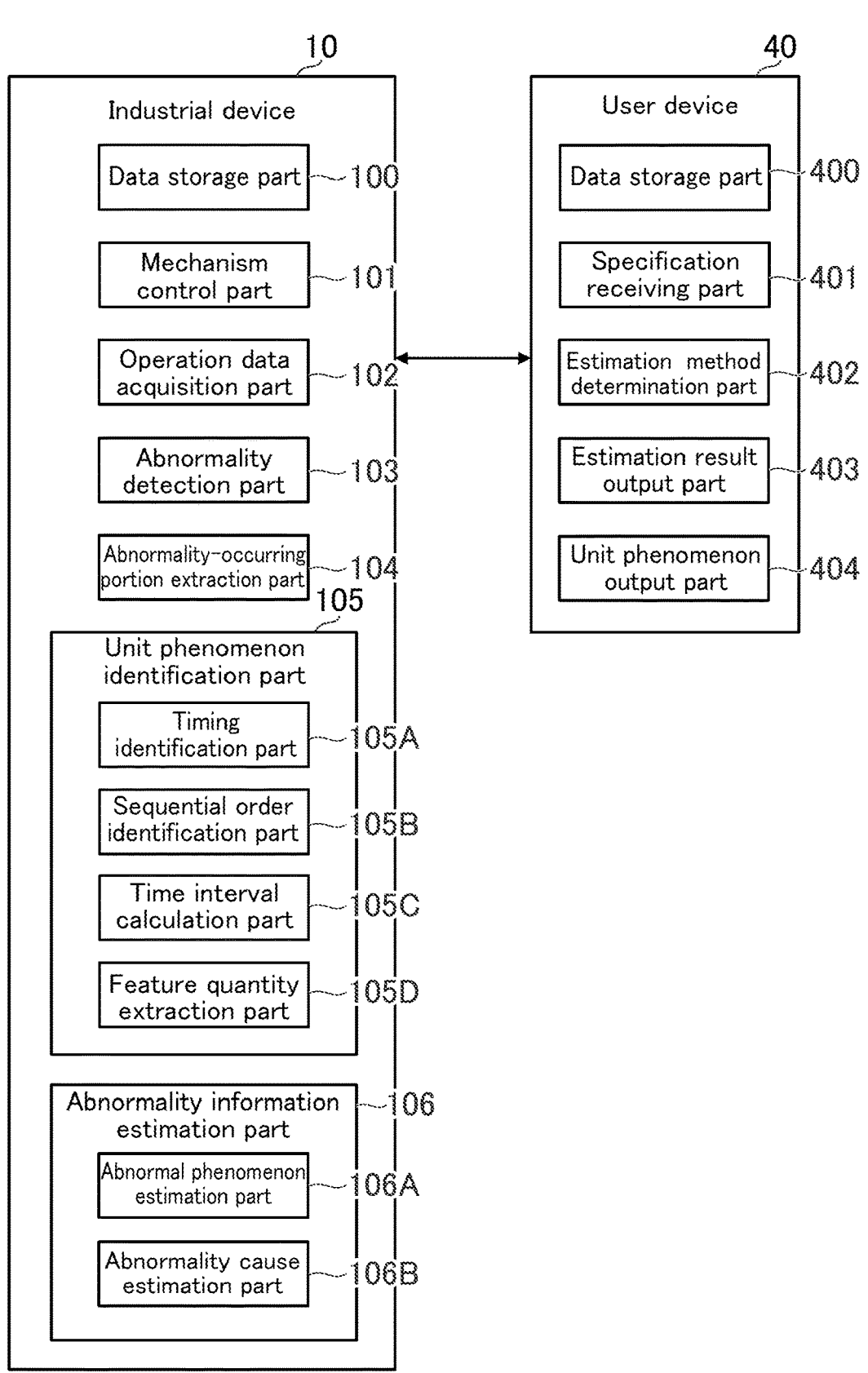

10

Industrial device

Data storage part ~100

Mechanism control part ~101

Operation data acquisition part ~102

Abnormality detection part ~103

Abnormality-occurring portion extraction part ~104

105

Unit phenomenon identification part

Timing identification part ~105A

Sequential order identification part ~105B

Time interval calculation part ~105C

Feature quantity extraction part ~105D

Abnormality information estimation part ~106

Abnormal phenomenon estimation part ~106A

Abnormality cause estimation part ~106B

40

User device

Data storage part ~400

Specification receiving part ~401

Estimation method determination part ~402

Estimation result output part ~403

Unit phenomenon output part ~404

FIG. 4

| Unit phenomenon | | | | Abnormal phenomenon | Abnormality cause |
|---|---|---|---|---|---|
| Unit phenomenon 1 | Unit phenomenon 2 | Unit phenomenon 3 | Unit phenomenon 4 | | |
| ○ | ○ | ○ | ○ | Abnormal phenomenon1 | Abnormality cause1 |
| ○ | ○ | ○ | × | Abnormal phenomenon2 | Abnormality cause2 |
| ○ | ○ | × | ○ | Abnormal phenomenon3 | Abnormality cause3 |
| ○ | ○ | × | × | Abnormal phenomenon4 | Abnormality cause4 |
| ○ | × | ○ | ○ | Abnormal phenomenon5 | Abnormality cause5 |
| . | . | . | . | . | . |

FIG. 6

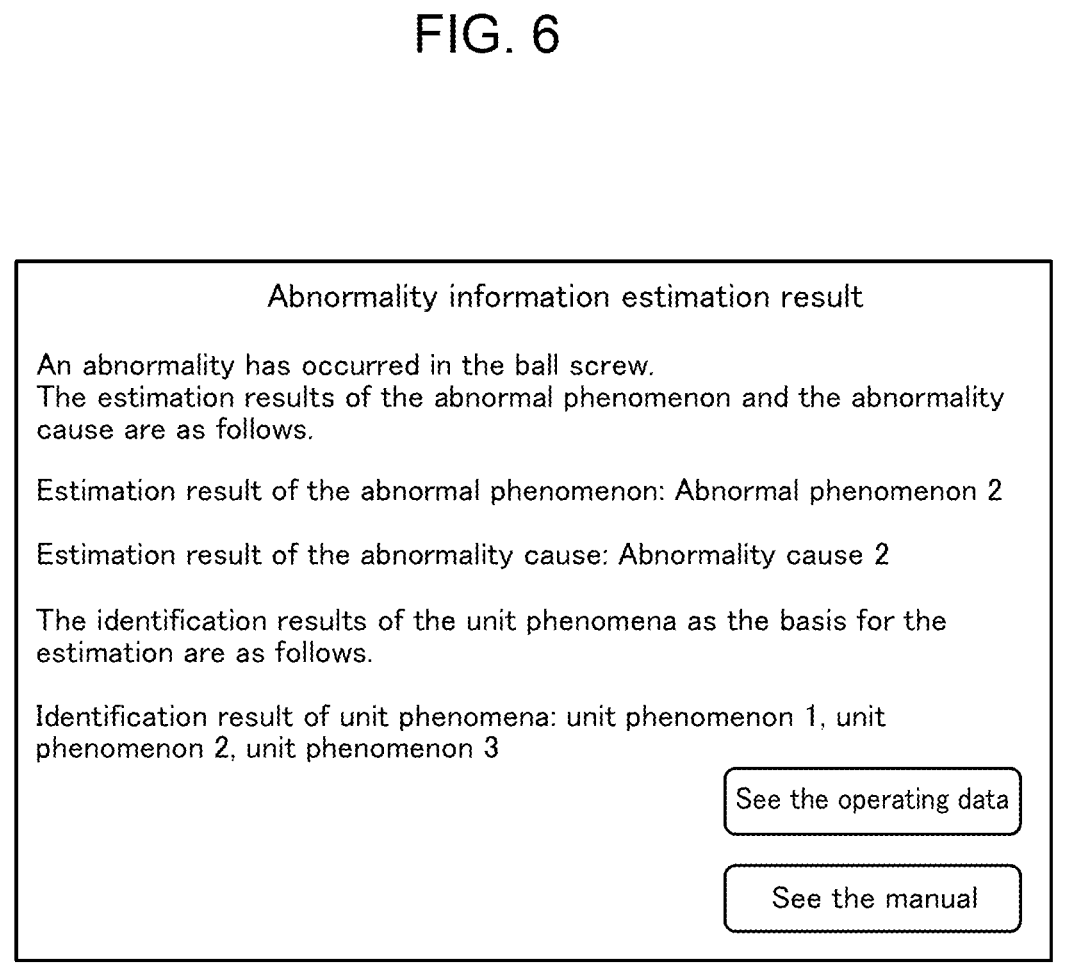

Abnormality information estimation result

An abnormality has occurred in the ball screw.
The estimation results of the abnormal phenomenon and the abnormality cause are as follows.

Estimation result of the abnormal phenomenon: Abnormal phenomenon 2

Estimation result of the abnormality cause: Abnormality cause 2

The identification results of the unit phenomena as the basis for the estimation are as follows.

Identification result of unit phenomena: unit phenomenon 1, unit phenomenon 2, unit phenomenon 3

See the operating data

See the manual

ABNORMALITY INFORMATION ESTIMATION SYSTEM, OPERATION ANALYSIS SYSTEM, MOTOR CONTROL DEVICE, ABNORMALITY INFORMATION ESTIMATION METHOD, AND PROGRAM

CROSS-REFERENCE TO RELATED APPLICATIONS

The present application is based upon and claims the benefit of priority to Japanese Patent Application No. 2021-178099, filed Oct. 29, 2021, the entire contents of which are incorporated herein by reference.

BACKGROUND OF THE INVENTION

Field of the Invention

The present invention relates to an abnormality information estimation system, an operation analysis system, a motor control device, an abnormality information estimation method, and a program.

Description of Background Art

Japanese Patent Application Laid-Open Publication No. 2020-128013 describes a device that generates a learning model for estimating an operation state of an industrial device using multiple partial time-series data obtained by sliding time-series data of a physical quantity related to the industrial device along a time-axis direction. Japanese Patent Application Laid-Open Publication No. 2020-153836 describes a system that extracts effective feature quantities with mutually independent temporal trends from multiple feature quantities calculated from a sensor of an industrial device, and diagnoses an abnormality of the industrial device based on the extracted feature quantities. Japanese Patent No. 6823576 describes that an industrial device to be diagnosed is caused to operate in a first operation mode and a second operation mode, and a cause of an abnormality of the industrial device is detected based on a combination of presence or absence of an abnormality in the first operation mode and in the second operation mode. The entire contents of these publications are incorporated herein by reference.

SUMMARY OF THE INVENTION

According to one aspect of the present invention, an abnormality information estimation system includes processing circuitry that identifies, based on operation data related to an operation of an industrial device that controls a mechanism, multiple unit phenomena due to the operation, and estimates abnormality information about an abnormality occurring in the mechanism based on the multiple of unit phenomena.

According to another aspect of the present invention, an operation analysis system includes processing circuitry that analyzes, based on operation data relating to an operation of an industrial device such that the operation is based on multiple first analysis methods independent of a type of a mechanism controlled by the industrial device, and analyzes the operation based on analysis results of the multiple first analysis methods and based on a second analysis method that is dependent on the type of the mechanism.

According to yet another aspect of the present invention, a motor control device includes a controller including circuitry that controls a motor, and processing circuitry that identifies, based on operation data related to an operation of the motor, multiple unit phenomena in an abnormal phenomenon caused by the operation, estimates abnormality information about an abnormality occurring in a mechanism driven by the motor based on the multiple unit phenomena, and stores, in a memory, an estimation result of the abnormality information.

According to still another aspect of the present invention, an abnormality information estimation method includes identifying, by processing circuitry, multiple unit phenomena in an abnormal phenomenon caused by an operation of an industrial device that controls a mechanism based on operation data related to the operation, and estimating, by the processing circuitry, abnormality information about an abnormality occurring in the mechanism based on the multiple unit phenomena.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is a functional block diagram illustrating an example of functions of an abnormality information estimation system according to an embodiment of the present invention;

FIG. 4 illustrates an example of classification data according to an embodiment of the present invention;

FIG. 6 illustrates an example of how an estimation result of abnormality information is output on a screen of an engineering tool according to an embodiment of the present invention;

DETAILED DESCRIPTION OF THE EMBODIMENTS

Figure 1:
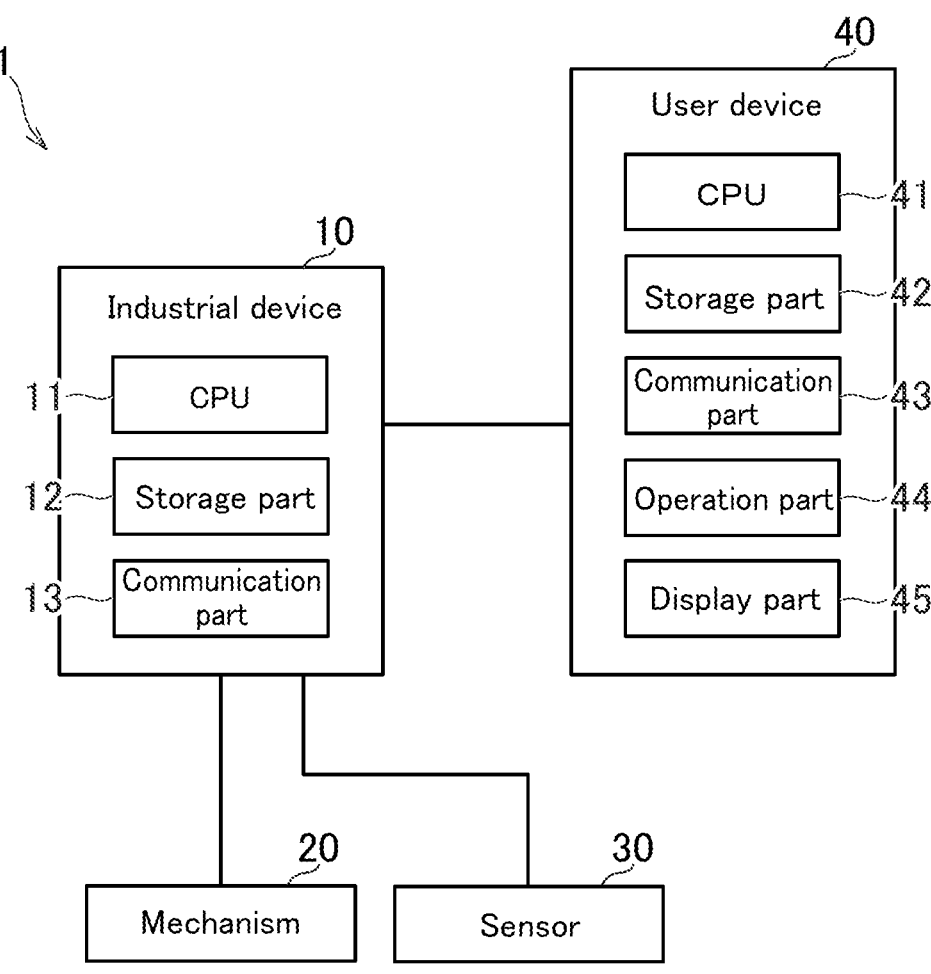
FIG. 1 illustrates an example of a hardware structure of an abnormality information estimation system according to an embodiment of the present invention.

Embodiments will now be described with reference to the accompanying drawings, wherein like reference numerals designate corresponding or identical elements throughout the various drawings.

Hardware Structure of Abnormality Information Estimation System

An example of an embodiment of an abnormality information estimation system according to the present disclosure is described. FIG. 1 illustrates an example of a hardware structure of the abnormality information estimation system. For example, an abnormality information estimation system 1 includes an industrial device 10, a mechanism 20, a sensor 30, and a user device 40. The abnormality information estimation system 1 may include at least one device and is not limited to the example in FIG. 1. For example, the abnormality information estimation system 1 may include only the industrial device 10.

The industrial device 10 is a device that controls the mechanism 20. In the present embodiment, a motor control device is described as an example of the industrial device 10. However, the industrial device 10 can be any device that can control some kind of mechanism, and is not limited to a motor control device. For example, the industrial device 10 may be a numerical control device, a host controller that manages a motor control device, a PLC (Programmable Logic Controller), a robot controller, or a cell controller. A CPU 11 includes at least one processor. A storage part 12 includes at least one of a volatile memory and a non-volatile memory. A communication part 13 includes at least one of a communication interface for wired communication and a communication interface for wireless communication.

The mechanism 20 is a machine controlled by the industrial device 10. The mechanism 20 may also be referred to as a "Mecha." In the present embodiment, a ball screw is described as an example of the mechanism 20. However, the mechanism 20 can be of any type and is not limited to a ball screw. For example, the mechanism 20 may be a transmission belt or a gear. The industrial device 10 may control at least one mechanism, and may control multiple mechanisms 20. The mechanism 20 includes at least one motor. For example, the mechanism 20 is connected to the industrial device 10 via a power line. In the present embodiment, the mechanism 20 includes a ball screw to which a motor is coupled, a linear guide, and a table. An object is positioned on the table. The object is an object of a work such as processing or inspection. The object is also referred to as a workpiece. The object is fixed on the table and moves with the table.

The sensor 30 detects information about an operation of the industrial device 10. In the present embodiment, a torque sensor is described as an example of the sensor 30. However, the sensor 30 can be of any type and is not limited to a torque sensor. For example, the sensor 30 may be a motor encoder, a vibration sensor, a motion sensor, an ultrasonic sensor, an infrared sensor, a temperature sensor, or a vision sensor. The sensor 30 may be incorporated into the mechanism 20 as a part of the mechanism 20. To the industrial device 10, at least one sensor 30 may be connected via a communication line or signal line, and multiple sensors 30 may be connected. The sensor 30 may be connected to the industrial device 10 via a device such as a hub.

The user device 40 is a device operated by a user. For example, the user device 40 is a personal computer, a tablet terminal, a smart phone, or a server computer. A CPU 41, a storage part 42, and a communication part 43 may be respectively similar to the CPU 11, the storage part 12, and the communication part 13. An operation part 44 is an input device such as a mouse or a keyboard. A display part 45 is a liquid crystal display or an organic EL display. For example, the user device 40 is connected to the industrial device 10 via a communication line. A user operates the user device 40 to perform various tasks such as a setting work or a maintenance work for the industrial device 10.

Programs stored in the devices may be supplied via a network. Further, the hardware structures of the devices are not limited to those of the above examples, and various kinds of hardware can be adopted. For example, a reading part (for example, a memory card slot) that reads a computer-readable information storage medium or an input-output part (for example, a USB terminal) for connecting to an external device may be included. In this case, a program stored in the information storage medium may be supplied via the reading part or the input-output part. Further, a circuit such as an ASIC or FPGA may be included in each of the devices. The CPUs (11, 41) are each an example of a structure called a circuitry. However, a circuit such as an ASIC or FPGA may correspond to a circuitry.

Overview of Abnormality Information Estimation System

Figure 2:
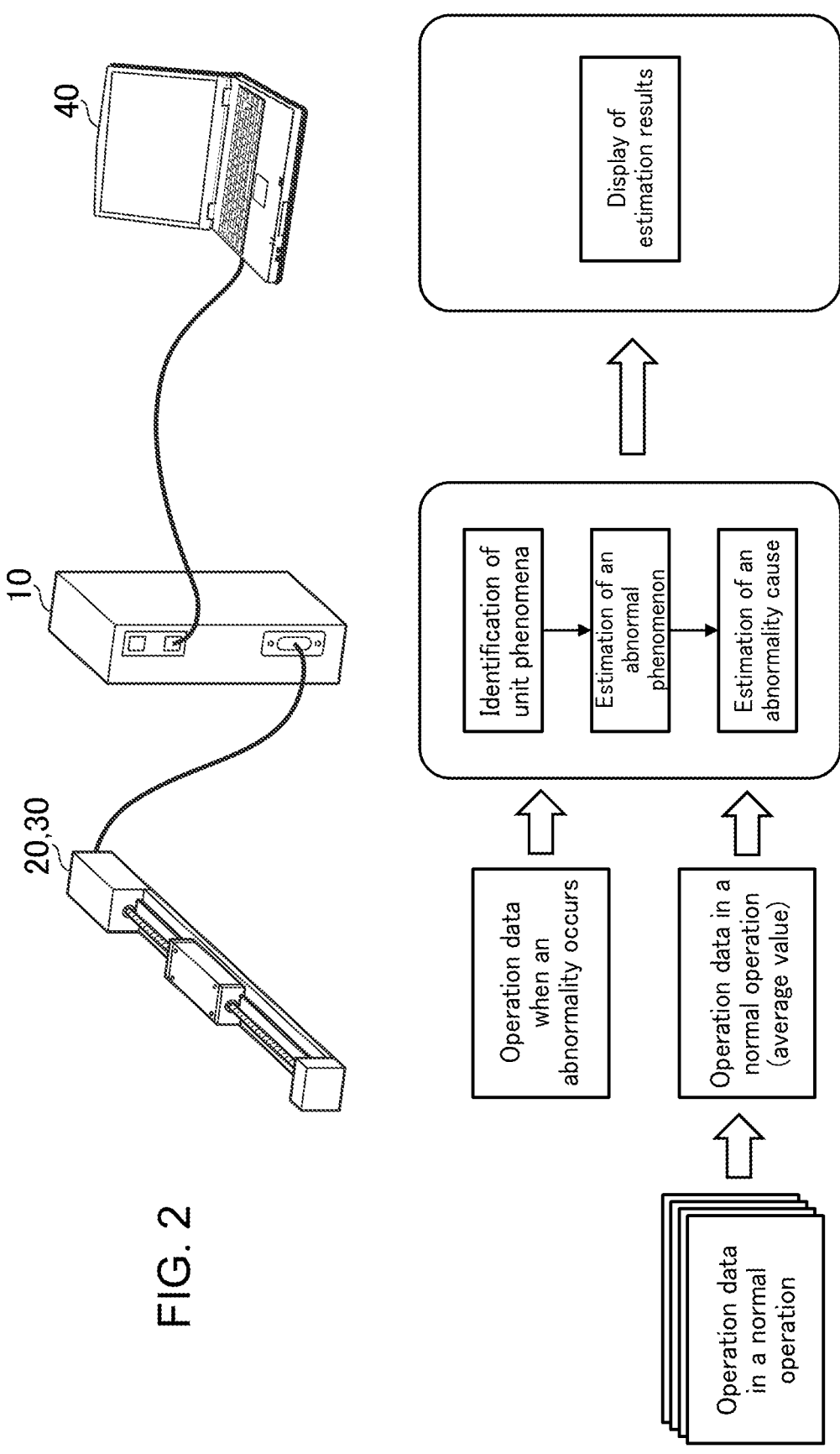
FIG. 2 illustrates an overview of an abnormality information estimation system according to an embodiment of the present invention.

FIG. 2 illustrates an overview of the abnormality information estimation system 1. The industrial device 10 executes a program stored in the storage part 12 and controls the mechanism 20 such that the table moves to a predetermined position. When any abnormality occurs in the mechanism 20, conventionally, an experienced engineer analyzes operation data of the industrial device 10 acquired using the sensor 30. The abnormality information estimation system 1 of the present embodiment enables troubleshooting by estimating an abnormal phenomenon and an abnormality cause based on the operation data of the industrial device 10 without relying on experience or intuition of an engineer.

An abnormal phenomenon is an abnormal phenomenon that occurs as a result of an operation of the mechanism 20 when the mechanism 20 is operated in a state in which an abnormality cause is present. An abnormal phenomenon can also be called an abnormal physical phenomenon. An abnormal phenomenon can also be an occurring incident itself. For example, an abnormal phenomenon is a slip phenomenon of an object or a table (a linear slip phenomenon), a slip phenomenon of a motor shaft (a rotational slip phenomenon), or a predetermined vibration phenomenon.

An abnormality cause is a cause that causes an abnormal phenomenon. For example, an abnormality cause is a cause that causes an abnormality in a state in which a phenomenon such as loosening of a screw or breakage of a part occurs in the mechanism 20 due to a human error or deterioration over time or the like. For example, an abnormality cause is that a screw is loose, that acceleration or deceleration is greater than expected, that friction is weaker than expected, that there is play in a screw hole, that a part such as a table is poorly balanced, or that a part such as a table has a weak rigidity.

In this regard, a feature appearing in the operation data of the industrial device 10 differs according to various conditions, such as a mechanism condition regarding the mechanism 20, a command condition regarding a command for controlling the mechanism 20, and a setting condition regarding a setting for controlling the mechanism 20. Therefore, it is considered that it is difficult to directly estimate an abnormal phenomena and an abnormality cause from the operation data of the industrial devices 10. On the other hand, in a case of a unit phenomenon included in an abnormal phenomenon, it is considered that identification is possible without depending on conditions such as a mechanism condition, a command condition, and a setting condition.

Unit phenomena are individual phenomena obtained by finely dividing an abnormal phenomenon. A unit phenomenon is defined as a single physical phenomenon so as not to depend on conditions such as a mechanism condition, a command condition, and a setting condition. An abnormal phenomena can be divided into multiple unit phenomena. The number of unit phenomena included in an abnormal phenomenon may be any number, and may be about 1-5, or may be more than 5. For example, the above-described "slip phenomenon of an object or a table" as an abnormal phenomenon is divided into a "sliding phenomenon" as a unit phenomenon of sliding in a movable range on a table and a "collision phenomenon" as a unit phenomenon after sliding in the movable range on the table. The "slip phenomenon of a motor shaft" as an abnormal phenomenon is divided into a "sliding phenomenon" as at least one unit phenomenon, and after that a "collision phenomenon" as a unit phenomenon does not occur.

From a point of view of a torque, the "sliding phenomenon" as a unit phenomenon can be a phenomenon in which a torque is reduced as compared to that in a normal operation, or a phenomenon in which a desired torque is not produced. From a point of view of inertia, the "sliding phenomenon" as a unit phenomenon can be a phenomenon in which inertia temporarily decreases during an operation of the mechanism 20. The "collision phenomenon" as a unit phenomenon can be occurrence of a spike waveform. Similarly, for other abnormal phenomena other than the "slip phenomenon" as an abnormal phenomenon, unit phenomena can be defined by finely dividing each individual abnormal phenomenon such that the unit phenomena are each independent of conditions such as a mechanism condition, a command condition, and a setting condition.

As illustrated in FIG. 2, when an abnormality occurs in the mechanism 20, operation data at the time of the abnormality is acquired. In FIG. 2, normal operation data sets and an average thereof are also illustrated, and these can be used when necessary. The industrial device 10 identifies multiple unit phenomena using an analytical method or a machine learning method, which will be described later, based on at least the operation data at the time of an abnormality. As described above, the unit phenomena are defined so as to be independent of conditions such as a mechanism condition, a command conditions, and a setting condition, and thus, can be directly identified from the operation data.

The industrial device 10 estimates an abnormal phenomenon based on multiple unit phenomena identified from the operation data at the time of an abnormality. Since unit phenomena are divisions of an abnormal phenomenon, when multiple unit phenomena are identified, an abnormal phenomenon that is difficult to be directly estimated from the operation data can also be estimated. The industrial device 10 also estimates an abnormality cause when necessary, and outputs estimation results of an abnormal phenomenon and an abnormality cause to the user device 40. The user device 40 displays the estimation results of the abnormal phenomenon and the abnormality cause acquired from the industrial device 10 on the display part 45. This enables troubleshoot when an abnormality occurs in the mechanism 20 without relying on experience or intuition of a skilled engineer. In the following, details of the abnormality information estimation system 1 are described.

Functions of Abnormality Information Estimation System

FIG. 3 is a functional block diagram illustrating an example of functions of the abnormality information estimation system 1.

Functions of Industrial Device

A data storage part 100 is mainly realized by the storage part 12. Other functions are mainly realized by the CPU 11.

Data Storage Part

The data storage part 100 stores data necessary for the processing executed by the industrial device 10. For example, the data storage part 100 stores, as data for controlling the mechanism 20, an operation program indicating an operation of the industrial device 10 and parameters referenced by the operation program. The operating program may be a commonly known program created using a ladder language or the like. The parameters also may be commonly known parameters, and include, for example, a rotation direction, a rotation speed, or a torque of a motor of the mechanism 20. The industrial device 10 controls a voltage with respect to the motor included in the mechanism 20 by executing the operation program and referencing the parameters as needed.

For example, the data storage part 100 stores an analysis program and a machine learning model as data for identifying unit phenomena. The analysis program is a program used in processing of an analytical method to be described later. For example, this program also executes processing for data conversion such as fast Fourier transform. The data storage part 100 also stores settings of a threshold and the like referenced by the analysis program. A machine learning model is a model used in processing of a machine learning method to be described later. For machine learning, a commonly known method may be used, for example, CNN (Convolutional Neural Network), R-CNN, or SSD (Single Shot Multibox Detector) can be used. A machine learning model is also called AI (Artificial Intelligence). A machine learning model can be a model of supervised machine learning, semi-supervised machine learning, or unsupervised machine learning. The data storage part 100 stores a program portion for a machine learning model to execute processing such as convolution, and a parameter portion to be adjusted by learning.

For example, the data storage part 100 stores classification data in which classifications of abnormal phenomena and abnormality causes are defined as data for estimating an abnormal phenomenon and an abnormality cause. The classification data is an example of data indicating a relation between multiple unit phenomena, and abnormal phenomenon and an abnormality cause. Contents of the classification data may be defined by a company that provides an engineering tool installed on the user device 40 or may be defined by a user.

FIG. 4 illustrates an example of the classification data. Although in FIG. 4 the classification data is illustrated in a table format, the classification data may be in any data format. For example, in the classification data, an abnormal phenomenon and an abnormality cause are defined for each combination of unit phenomena. In the example of FIG. 4, a case is described where four types of unit phenomena including unit phenomena 1-4 are illustrated. However, it is sufficient that a combination of two or more types of unit phenomena is illustrated in the classification data. A circle in FIG. 4 indicates that a unit phenomenon has been identified by a unit phenomenon identification part 105 (to be described later). A cross indicates that a unit phenomenon has not been identified by the unit phenomenon identification part 105.

For example, when all the unit phenomena 1-4 have been identified, an abnormal phenomenon 1 and an abnormality cause 1 are estimated. When the unit phenomena 1-3 have been identified and the unit phenomenon 4 has not been identified, an abnormal phenomenon 2 and an abnormality cause 2 are estimated. When the unit phenomenon 1 and the unit phenomenon 2 have been identified and the unit phenomenon 3 and the unit phenomenon 4 have not been identified, an abnormal phenomenon 4 and an abnormality cause 4 are estimated. Similarly, for each of other combinations of occurrence or non-occurrence of the unit phenomena, an abnormal phenomenon and an abnormality cause are defined in the classification data.

In the example of FIG. 4, a case is illustrated where a combination of unit phenomena corresponds to an abnormal phenomenon and an abnormality cause on a one-to-one basis. However, these may be in a one-to-many or many-to-one relation. That is, with respect to one combination of the unit phenomena, multiple abnormal phenomena and/or multiple abnormality causes may be defined. Conversely, with respect to multiple combinations of the unit phenomena, one abnormal phenomenon and one abnormality cause may be defined. A relation between abnormal phenomena and abnormality causes may be of one-to-many or many-to-one instead of one-to-one. These relations can define any relations.

Further, in the example of FIG. 4, the case is described where the types of the identified unit phenomena are defined in the classification data. However, it is also possible that information other than the types of the unit phenomena is defined in the classification data. For example, a relation between a timing, a sequential order, a time interval, or a feature quantity of a unit phenomenon, which will be described later, and an abnormal phenomena and an abnormality cause may be defined in the classification data. Further, a relation between a combination of these multiple pieces of information regarding a unit phenomenon and an abnormal phenomena and an abnormality cause may be defined in the classification data. That is, a relation between not only occurrence or non-occurrence of each of the unit phenomena 1-4 in FIG. 4, but also a combination including a timing of occurrence and the like, and an abnormal phenomenon and an abnormality cause may be defined in the classification data. In addition, for example, information such as a probability of occurrence of a unit phenomenon or a frequency of occurrence of a unit phenomenon may be defined in the classification data.

Mechanism Control Part

A mechanism control part 101 controls the mechanism 20. The mechanism control part 101 controls at least the motor included in the mechanism 20. The mechanism control part 101 is an example of a motor control part that controls a motor. As a method for controlling a motor, various methods can be used. For example, the mechanism control part 101 controls a voltage with respect to the motor included in mechanism 20 by executing the operation program stored in the data storage part 100 and referencing the parameters stored in the data storage part 100. The mechanism control part 101 may control the mechanism 20 based on a detection result of the sensor 30.

Operation Data Acquisition Part

An operation data acquisition part 102 acquires the operation data. The operation data is data related to an operation of the industrial device 10. In the present embodiment, a case is described where numerical values related to an operation of the industrial device 10 are indicated in the operation data on a time-series basis. However, the operation data may be instantaneous values indicating an operation at a certain time point. The operation data may also be referred to as waveform data or trace data. For example, the operation data acquisition part 102 acquires the operation data based on a detection signal of the sensor 30. The operation data acquisition part 102 measures a physical quantity such as a torque detected by the sensor 30 on a time-series basis, and acquires operation data indicating a time-series variation of the physical quantity. It is also possible that the operation data acquisition part 102 acquires the operation data based on a processing result of the operation program instead of a detection signal of the sensor 30. That is, the operation data may be data indicating an internal processing result of the industrial device 10.

Figure 5:
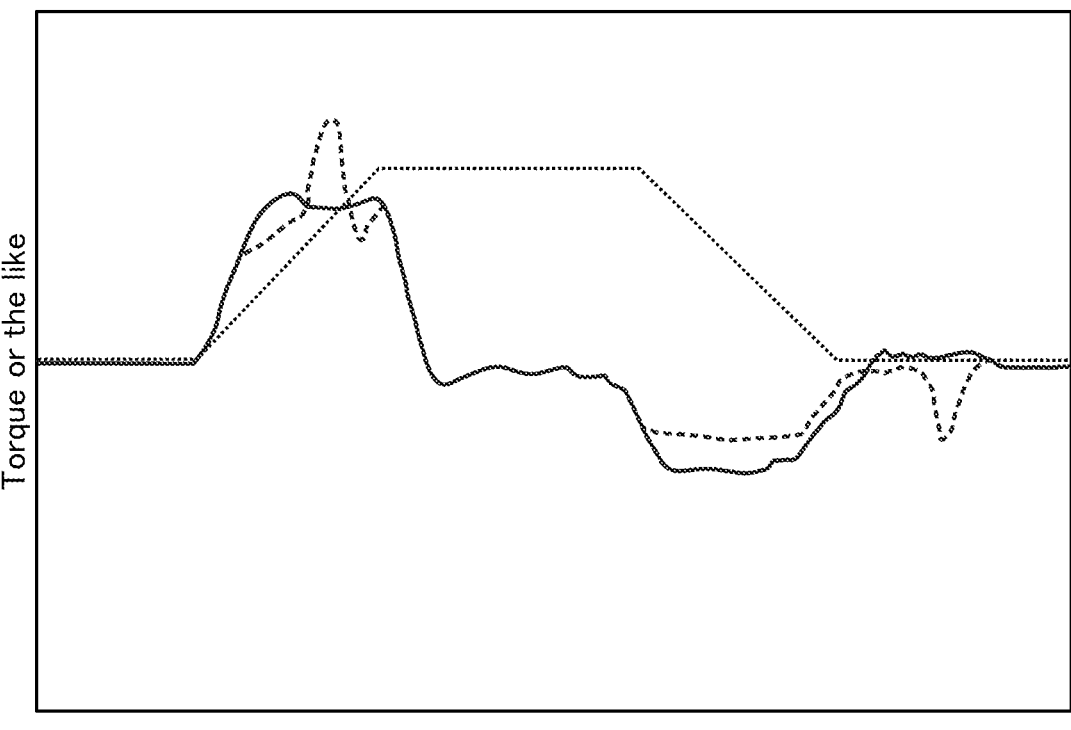
FIG. 5 illustrates an example of operation data according to an embodiment of the present invention.

FIG. 5 illustrates an example of the operation data. In the example of FIG. 5, operation data indicating a torque command during a normal operation (solid line), operation data indicating a torque command in a case of an abnormality (broken line), and operation data indicating a position command speed (dotted line) are illustrated. In FIG. 5, a horizontal axis is a time axis, and a vertical axis is an axis indicating numerical values of a torque and the like. As illustrated in FIG. 5, when an abnormality occurs in each of an acceleration period during which the position command speed increases and a deceleration period during which the position command speed decreases, a difference in torque command increases. The operation data acquisition part 102 can acquire any type of operation data. Operation data acquired by the operation data acquisition part 102 is not limited to that in the example illustrated in FIG. 5. For example, the operation data acquisition part 102 can acquire various types of operation data such as an estimated disturbance torque, a position deviation, a feedback speed, or a detection value of a vibration sensor.

Abnormality Detection Part

An abnormality detection part 103 detects occurrence of an abnormality based on the operation data. In the present embodiment, the abnormality detection part 103 detects whether or not any abnormality has occurred, and an abnormal phenomenon and an abnormality cause regarding specific details of an abnormality are estimated by an abnormality information estimation part 106 to be described later. The abnormality detection part 103 may detect occurrence of an abnormality based on only one operation data set, or may detect occurrence of an abnormality based on multiple mutually different operation data sets (for example, two operation data sets including operation data indicating a torque command and operation data indicating a detection value of a vibration sensor). The abnormality detection part 103 may detect occurrence of an abnormality based on at least one operation data set.

For example, the abnormality detection part 103 detects occurrence of an abnormality based on operation data during a normal operation and most recent operation data acquired by the operation data acquisition part 102. It is assumed that the operating data during a normal operation is stored in advance in the data storage part 100. For example, the abnormality detection part 103 determines that no abnormality has occurred when a difference between the operation data during a normal operation and the most recent operation data is less than a threshold. The abnormality detection part 103 determines that an abnormality has occurred when the difference between the operation data during a normal operation and the most recent operation data is equal to or larger than the threshold. For this distance, any indicator can be used, and, for example, a Mahalanobis distance may be used.

As a method for the abnormality detection part 103 to detect occurrence of an abnormality, various methods can be used. In addition to the method of using the operation data during a normal operation, for example, the abnormality detection part 103 may determine that an abnormality has occurred when a difference between most recent operation data and an average value of operation data at multiple earlier time points is equal to or larger than a threshold. For example, the abnormality detection part 103 may determine that an abnormality has occurred when the number of time points at which a numerical value indicated by most recent operation data is equal to or greater than a predetermined threshold is equal to or greater than a predetermined number. The abnormality detection part 103 may determine that an abnormality has occurred when an amount of time-series variation in numerical value indicated by most recent operation data is equal to or larger than a threshold.

Abnormality-Occurring Portion Extraction Part

An abnormality-occurring portion extraction part 104 extracts multiple abnormality-occurring portions from operation data. For the abnormality-occurring portions, a case is described where a machine learning method (to be described later) is used. However, it is also possible that an analytical method is used. The abnormality-occurring portion extraction part 104 may extract multiple abnormality-occurring portions from one operation data set, or may extract multiple abnormality-occurring portions from multiple mutually different operation data sets (for example, two operation data sets, including operation data indicating a torque command and operation data indicating a detection value of a vibration sensor). In this case, one or more abnormality-occurring portions are extracted from one operation data set. The abnormality-occurring portion extraction part 104 may extract multiple abnormality-occurring portions based on at least one operation data set.

An abnormality-occurring portion is a portion of operation data where an abnormality has occurred. That is, an abnormality-occurring portion is a period in an entire period indicated by operation data where an abnormality has occurred. In the case of the operation data illustrated in FIG. 5, when abnormalities have respectively occurred in an acceleration period and a deceleration period (for example, when the above-described difference is equal to or larger than the threshold in the acceleration period and the deceleration period), the abnormality-occurring portion extraction part 104 extracts a portion of the acceleration period and a portion of the deceleration period from the operation data. For example, when it is possible to pinpoint a time point at which an abnormality has occurred, the abnormality-occurring portion extraction part 104 may extract, as an abnormality-occurring portion, a period from a predetermined time before this time point to a predetermined time after this time point.

Unit Phenomenon Identification Part

The unit phenomenon identification part 105 identifies multiple unit phenomena related to an operation of the industrial device 10 that controls the mechanism 20 based on operation data related to the operation. The unit phenomenon identification part 105 may identify multiple unit phenomena based on one operation data set, or may identify multiple unit phenomena based on multiple mutually different operation data sets (for example, two operation data sets including operation data indicating a torque command and operation data indicating a detection value of a vibration sensor). In this case, one or more unit phenomena may be identified from one operation data sets. The unit phenomenon identification part 105 may identify multiple unit phenomena based on at least one operation data set.

Identifying a unit phenomenon means identifying information about the unit phenomenon. For example, identifying a type of a unit phenomenon corresponds to identifying the unit phenomenon. Identifying a unit phenomenon is not limited to identifying a type of the unit phenomenon, and may mean identifying a timing, a time interval, or a feature quantity of the unit phenomenon as will be described later. In addition, for example, identifying the number of times of occurrence or a frequency of occurrence of a unit phenomenon, or comprehensively identifying multiple pieces of information about a unit phenomenon may correspond to identifying the unit phenomenon. The unit phenomenon identification part 105 identifies multiple unit phenomena based on the operation data acquired by the operation data acquisition part 102 and a predetermined unit phenomenon identification method.

The unit phenomenon identification method is an algorithm for identifying a unit phenomenon. Data indicating the unit phenomenon identification method is stored in advance in the data storage part 100. The unit phenomenon identification method can be information about a relation between a feature of the operation data and a unit phenomenon. The unit phenomenon identification part 105 identifies a unit phenomenon corresponding to a feature of the operation data. For example, a program for identifying a unit phenomenon, a type of operation data input to the program, a threshold used by the program, or a combination of these corresponds to the unit phenomenon identification method.

In the present embodiment, the unit phenomenon identification part 105 identifies multiple unit phenomena when the abnormality detection part 103 has detected occurrence of an abnormality. That is, when the abnormality detection part 103 has not detected occurrence of an abnormality, the unit phenomenon identification part 105 does not execute unit phenomenon identification processing. It is also possible that the unit phenomenon identification part 105 continues to execute unit phenomenon identification processing even when occurrence of an abnormality has not been detected. In this case, it is also possible that the abnormality detection part 103 is not included in the industrial device 10.

In the present embodiment, the unit phenomenon identification part 105 identifies multiple unit phenomena based on an identification method that is independent of the type of the mechanism 20. The type of the mechanism 20 can be a type or classification of the mechanism 20. The identification method that is independent of the type of the mechanism 20 is the same identification method regardless of the type of the mechanism 20. For example, when there are three types of mechanisms 20 such as a ball screw, a transmission belt, or a gear, the unit phenomenon identification method is common to these three types. Regardless which one of these three types is controlled by the industrial device 10, the unit phenomenon identification method is the same. The type of the mechanism 20 may be any type and is not limited to these three types.

It is also possible that the unit phenomenon identification method is dependent on the type of the mechanism 20. That is, the unit phenomenon identification method may differ depending on the type of the mechanism 20. For example, the unit phenomenon identification method may be different when the mechanism 20 is a ball screw, when the mechanism 20 is a transmission belt, and when the mechanism 20 is a gear. In this case, it is assumed that, for each type of mechanism 20, data indicating a unit phenomenon identification method is stored in advance in the data storage part 100. The unit phenomenon identification part 105 may identify a unit phenomenon based on an identification method corresponding to the type of the mechanism 20.

In the present embodiment, as examples of the unit phenomenon identification method, two methods, an analytical method and a machine learning method, are described. The unit phenomenon identification method may be only one of an analytical method and a machine learning method, or may be a method called by another name.

First, an example of an analytical method is described. For example, the unit phenomenon identification part 105 identifies one or more unit phenomena by analyzing operation data based on an analytical method. The analytical method is a method for identifying a unit phenomenon by analyzing operation data using a predetermined analysis method. In the analytical method, a unit phenomenon is identified by determining whether or not a feature of the operation data is a predetermined feature. For example, in the analytical method, magnitudes, time-series variation, distribution, or a combination of these, of numerical values contained in the operation data are analyzed. Ii is assumed that a program and a threshold used in the analytical method are stored in advance in the data storage part 100.

For example, the unit phenomenon identification part 105 may identify a unit phenomenon by analyzing the operation data based on an analytical method in which a k-neighborhood method is used. The k-neighborhood method is a method in which, with respect to a portion of the operation data, numerical values other than a numerical value at one time point in this portion are considered to be normal, and an abnormality degree at this time point is calculated. A portion in the operation data for which an abnormality degree is to be calculated is referred to as a frame. By gradually moving the frame along a time axis direction, an abnormality degree is calculated with respect to each of multiple portions in the operation data.

According to the k-neighborhood method, the abnormality degree increase at a time point where there is a sudden change. The unit phenomenon identification part 105 identifies that a predetermined unit phenomenon has occurred based on the abnormality degree calculated using the k-neighborhood method. For example, the unit phenomenon identification part 105 may identify a unit phenomenon associated with a threshold when the abnormality degree is equal to or greater than the threshold, or may identify a unit phenomenon associated with a distribution of the abnormality degree when the distribution is a predetermined distribution. It is assumed that data that defines a unit phenomenon to be identified for predetermined operating data and a predetermined abnormality degree is stored in advance in the data storage part 100.

For example, the unit phenomenon identification part 105 may identify a unit phenomenon by analyzing operation data based on an analytical method using a cross-correlation coefficient. A cross-correlation coefficient is a numerical value that indicates a correlation between multiple operation data sets. When a certain unit phenomenon has occurred, a cross-correlation coefficient is used in a case where there is a tendency that a certain operation data set and another operation data set change in conjunction with each other. Operation data sets for which a cross-correlation coefficient is applied may be any combination. For example, the operation data sets may be an operation data set indicating an estimated disturbance torque and an operation data set indicating a torque command. Data that defines a unit phenomenon to be identified for a predetermined combination of operating data sets in a predetermined correlation is stored in advance in the data storage part 100.

For example, the unit phenomenon identification part 105 extracts a portion of multiple operation data sets. This portion is a portion where a characteristic change is likely to appear when a unit phenomenon occurs. This portion may be a predetermined portion, or may be, for example, a whole or a portion of an acceleration period or a deceleration period. The unit phenomenon identification part 105 calculates a cross-correlation coefficient of this portion, and identifies a predetermined unit phenomenon when the cross-correlation coefficient is equal to or greater than a threshold. That is, the unit phenomenon identification part 105 identifies a predetermined unit phenomenon when there is a correlation between magnitudes of numerical values or changes in time-series numerical values of portions extracted from multiple operation data sets. A cross-correlation coefficient can be calculated using various methods. The analytical method is not limited to a method using the k-neighborhood method and the cross-correlation coefficient, and other methods may be used. For example, a method in which a numerical value of an abnormality-occurring portion is simply compared to a threshold, a method in which the number and time intervals of time points at which the Mahalanobis distance is equal to or larger than a threshold are used, or a method in which a frequency-related feature quantity is calculated by a fast Fourier transform, may be used as an analytical method.

Next, an example of a machine learning method is described. For example, one or more unit phenomena may be identified based on a machine learning model capable of estimating a unit phenomenon. In the present embodiment, it is assumed that a machine learning model has already learned training data that indicates a relation between operation data for training and a unit phenomenon. The machine learning model may output only occurrence or non-occurrence of a certain specific unit phenomenon, or may output occurrence or non-occurrence of each of multiple unit phenomena, similar to a multi-label (multi-class) machine learning model. In addition, for example, the machine learning model may output a score that indicates a probability (likelihood) that a unit phenomenon has occurred.

The operation data may be entirely input to the machine learning model. However, in the present embodiment, it is assumed that only a part of the operation data is input. For example, the processing of the abnormality-occurring portion extraction part 104 may also be executed in the machine learning model. In addition, for example, operation data representing a waveform may be converted into an image and then input to the machine learning model. For example, the unit phenomenon identification part 105 identifies one or more unit phenomena based on multiple abnormality-occurring portions of the operation data and the machine learning model. The unit phenomenon identification part 105 inputs each of the abnormality-occurring portions to the machine learning model and acquires an output from the machine learning model for each of the abnormality-occurring portions. When necessary, the abnormality-occurring portions may be normalized before being input to the machine learning model.

The machine learning model executes processing such as convolution with respect to an input abnormality-occurring portion, and outputs information indicating an estimation result of a unit phenomenon. The unit phenomenon identification part 105 identifies a unit phenomenon by comprehensively considering an output of the machine learning model corresponding to each of the multiple abnormality-occurring portions. For example, the unit phenomenon identification part 105 may calculate one evaluation value based on multiple outputs acquired from the machine learning model, and identify a unit phenomenon when this evaluation value is equal to or larger than a threshold. In addition, for example, the unit phenomenon identification part 105 may identify a unit phenomenon when the number of abnormality-occurring portions, where an output from the machine learning model is a predetermined result, is equal to or larger than a threshold.

For example, the unit phenomenon identification part 105 may identify multiple unit phenomena based on multiple mutually different operation data sets. The above-described method using a cross-correlation coefficient is an example of a case where multiple operation data sets are used. For example, the unit phenomenon identification part 105 may identify a unit phenomenon using the k-neighborhood method with respect to each of multiple operation data sets. For example, the unit phenomenon identification part 105 may input each of multiple operation data sets to the machine learning model and identify a unit phenomenon based on an output from the machine learning model. The unit phenomenon identification part 105 may input each of multiple operation data sets into a separate machine learning model and identify a unit phenomenon based on an output from each of the multiple machine learning models.

For example, the unit phenomenon identification part 105 may include a timing identification part (105A) that identifies a timing of occurrence of a unit phenomenon. This timing is a timing on a time axis indicated by the operation data. For example, the timing is a relative time point or period when an abnormality occurs with respect to a series of repeatedly executed operations. The timing can also be referred to as a time, a period, or an interval. In the example of the operation data of FIG. 5, there are timings such as an acceleration period, a deceleration period, a constant-speed period, and a period after stopping.

The unit phenomenon identification part 105 identifies a timing of a portion, based on which a unit phenomenon is identified, in the time axis indicated by the operation data. In the case of an analytical method, the timing identification part (105A) identifies a timing when a numerical value included in the operation data or an amount of change thereof is equal to or larger than a threshold. In the case of a machine learning method, the timing identification part (105A) uses a heat map or the like to identify, as a timing, a portion based on which the machine learning model identifies a unit phenomenon. The timing identification part (105A) may identify timings of all unit phenomena, or may specify timings of only some unit phenomena.

For example, the unit phenomenon identification part 105 may include a sequential order identification part (105B) that identifies a sequential order of a unit phenomenon. The sequential order is a sequential order of timings of occurrence of multiple unit phenomena in the time axis indicated by the operation data. That is, the sequential order is a temporal anteroposterior relation. The sequential order identification part (105B) identifies a sequential order for each of multiple unit phenomena by comparing the timings of the individual unit phenomena identified by the timing identification part (105A). The sequential order identification part (105B) may identify sequential orders of all unit phenomena, or may identify sequential orders of some unit phenomena only.

For example, the unit phenomenon identification part 105 may include a time interval calculation part (105C) that calculates time intervals of unit phenomena. A time interval is a length of time from occurrence of a certain unit phenomenon to occurrence of a next unit phenomenon on the time axis indicated by the operation data. The time interval calculation part (105C) calculates time intervals of the timings of the individual unit phenomena identified by the timing identification part (105A). The time interval calculation part (105C) may calculate time intervals of all unit phenomena, or may calculate time intervals of some unit phenomena only.

For example, the unit phenomenon identification part 105 may include a feature quantity extraction part (105D) that extracts a feature quantity related to a portion of the operation data corresponding to a unit phenomenon. A feature quantity is information obtained by quantifying a feature of a numerical value or a change thereof indicated by the operation data. When the operation data is waveform data, a shape feature of a waveform corresponds to a feature quantity. For example, a magnitude of a numerical value, an amplitude of a waveform, a shape of a waveform, or a combination of these correspond to a feature quantity. In addition, for example, information such as an amount of change in numerical value, an average value in a certain period, or a deviation from normal data may correspond to a feature quantity. It is assumed that a calculation formula for a feature quantity is stored in advance in the data storage part 100. The feature quantity extraction part (105D) calculates a feature quantity based on the operation data and this calculation formula. An object of the feature quantity calculation is a portion corresponding to a unit phenomenon. This portion includes at least a timing of occurrence of a unit phenomenon. This portion may be only a pinpoint timing at which a unit phenomenon occurs, or may be a period from a predetermined time before this timing to a predetermined time after this timing.

Abnormality Information Estimation Part

The abnormality information estimation part 106 estimates abnormality information about an abnormality that has occurred in the mechanism 20 based on multiple unit phenomena. The abnormality information is a concept that includes an abnormal phenomenon and an abnormality cause. The abnormality information may be any information related to an abnormality. The abnormality information may mean only one of an abnormal phenomenon and an abnormality cause, or may indicate only occurrence or non-occurrence of an abnormality. The abnormality information may include other information such as a timing of occurrence of an abnormal phenomenon. In the following description, in a case where it is possible that only one of an abnormal phenomenon and an abnormality cause is estimated, the abnormal phenomenon or the abnormality cause is described as abnormality information.

It is assumed that data indicating a relation between multiple unit phenomena and abnormality information is stored in the data storage part 100. Without being limited to a relation between a combination of types of unit phenomena and abnormality information, this relation may also be a relation between the number of unit phenomena and abnormality information. The abnormality information estimation part 106 estimates abnormality information associated with multiple unit phenomena. This data is not limited to tabular data such as the classification data in FIG. 4. For example, this data may be a program and a parameter of a machine learning model, and the abnormality information estimation part 106 may use the machine learning model to estimate abnormality information. This machine learning model is a model for estimating abnormality information, and is different from a model for identifying a unit phenomenon. In this case, it is assumed that the machine learning model has learned a relation between multiple unit phenomena and abnormality information.

In the present embodiment, the abnormality information estimation part 106 has an abnormal phenomenon estimation part (106A) that estimates an abnormal phenomenon occurring in an operation of the industrial device 10 based on multiple unit phenomena. For example, the abnormal phenomenon estimation part (106A) estimates an abnormal phenomenon by referencing the classification data and identifying an abnormal phenomenon associated with multiple unit phenomena. The method for estimating an abnormal phenomenon may be another method, and is not limited to the method in which the classification data is referenced. For example, a machine learning model that has learned a relation between an abnormal phenomenon and information about unit phenomena may be used. In this case, the abnormal phenomenon estimation part (106A) inputs the information about the unit phenomena into the machine learning model and causes the machine learning model to estimate an abnormal phenomenon. The abnormal phenomenon estimation part (106A) estimates an abnormal phenomenon by acquiring an abnormal phenomenon output from the machine learning model. In addition, for example, the abnormal phenomenon estimation part (106A) may estimate an abnormal phenomenon from multiple unit phenomena using a rule such as a decision tree instead of a table such as the classification data.

In the present embodiment, the abnormality information estimation part 106 further has an abnormality cause estimation part (106B) that, based on an abnormal phenomenon, estimates an abnormality cause that is a cause of the abnormal phenomenon. For example, the abnormality cause estimation part (106B) estimates an abnormality cause by referencing the classification data and identifying an abnormality cause associated with multiple unit phenomena. The method for estimating an abnormality cause may be another method, and is not limited to the method in which the classification data is referenced. For example, a machine learning model that has learned a relation between an abnormality cause and information about at least one of unit phenomena and an abnormal phenomenon may be used. In this case, the abnormality cause estimation part (106B) inputs information about at least one of unit phenomena and an abnormal phenomenon to the machine learning model and causes the machine learning model to estimate an abnormality cause. The abnormality cause estimation part (106B) estimates an abnormality cause by acquiring an abnormality cause output from the machine learning model. In addition, for example, an abnormality cause may be estimated from at least one of unit phenomena and an abnormal phenomenon using a rule such as a decision tree instead of a table such as the classification data. In this case, an abnormality cause may be directly estimated from the unit phenomena without estimating an abnormal phenomenon. However, also in this case, there is a possibility that an internal feature quantity representing an abnormal phenomenon is calculated in the machine learning model.

In the present embodiment, the abnormality information estimation part 106 estimates abnormality information based on an estimation method that is dependent on the type of the mechanism 20. An estimation method that is dependent on the type of the mechanism 20 is an estimation method according to the type of mechanism 20. For example, when there are three types of mechanisms 20 such as a ball screw, a transmission belt, and a gear, the method for estimating abnormality information may be different between these three types. For example, the method for estimating abnormality information may be different when the mechanism 20 is a ball screw, when the mechanism 20 is a transmission belt, and when the mechanism 20 is a gear. In this case, it is assumed that, for each type of mechanism 20, data indicating a method for estimating abnormality information is stored in advance in the data storage part 100. The abnormality information estimation part 106 may estimate abnormality information based on an estimation method according to the type of the mechanism 20.

It is also possible that a method for estimating abnormality information is independent of the type of the mechanism 20. That is, the method for estimating abnormality information may be the same regardless of the type of the mechanism 20. For example, the method for estimating abnormality information may be the same when the mechanism 20 is a ball screw, when the mechanism 20 is a transmission belt, and when the mechanism 20 is a gear. In this case, it is assumed that data indicating a common estimation method regardless of the type of the mechanism 20 is stored in advance in the data storage part 100.

For example, the abnormality information estimation part 106 may estimate abnormality information based on an estimation method determined by an estimation method determination part 402 to be described later. The abnormality information estimation part 106 estimates abnormality information based on an estimation method according to the type of the mechanism 20 specified by a user among multiple estimation methods. It is assumed that information indicating the type of the mechanism 20 specified by the user or information indicating the estimation method according to this type is stored in the data storage part 100. All the estimation methods may be stored in the data storage part 100. In this case, the abnormality information estimation part 106 may use only the estimation method according to the type of the mechanism 20 specified by the user.

For example, the abnormality information estimation part 106 may estimate abnormality information based on a timing identified by the timing identification part (105A). In this case, it is assumed that data indicating a relation between timings of occurrence of unit phenomena and abnormality information is stored in the data storage part 100. As described above, without being limited to a table such as the classification data, this data may be a machine learning model or a rule. Based on this data, the abnormality information estimation part 106 estimates abnormality information according to timings of occurrence of the unit phenomena.

For example, the abnormality information estimation part 106 may estimate abnormality information based on the sequential orders identified by the sequential order identification part (105B). In this case, it is assumed that data indicating a relation between the sequential orders of the unit phenomena and the abnormality information is stored in the data storage part 100. As described above, without being limited to a table such as the classification data, this data may be a machine learning model or a rule. Based on this data, the abnormality information estimation part 106 estimates abnormality information according to the sequential orders in which the unit phenomena have occurred.

For example, the abnormality information estimation part 106 may estimate abnormality information based on the time intervals calculated by the time interval calculation part (105C). In this case, it is assumed that data indicating a relation between the time intervals at which the unit phenomena have occurred and the abnormality information is stored in the data storage part 100. As described above, without being limited to a table such as the classification data, this data may be a machine learning model or a rule. Based on this data, the abnormality information estimation part 106 estimates abnormality information according to the time intervals at which the unit phenomena have occurred.

For example, the abnormality information estimation part 106 may estimate abnormality information based on the feature quantity extracted by the feature quantity extraction part (105D). In this case, it is assumed that data indicating a relation between feature quantities of the unit phenomena and the abnormality information is stored in the data storage part 100. As described above, without being limited to a table such as the classification data, this data may be a machine learning model or a rule. Based on this data, the abnormality information estimation part 106 estimates abnormality information according to the feature quantities of the unit phenomena.

Functions of User Device

A data storage part 400 is mainly realized by the storage part 42. Other functions are mainly realized by the CPU 41.

Data Storage Part

The data storage part 400 stores data necessary for setting the industrial device 10. For example, the data storage part 400 stores an engineering tool. The engineering tool is a program that assists a user in setting the industrial device 10. With the engineering tool, it is possible to create an operation program to be executed by the industrial device 10, set a parameter to be recorded in the industrial device 10, or display a screen related to abnormality information. In addition, for example, the data storage part 400 may store data indicating a method for identifying a unit phenomenon and data indicating a method for estimating abnormality information.

Specification Receiving Part

A specification receiving part 401 receives specification of a type of the mechanism 20 by a user. For example, in the user device 40, when the engineering tool is launched, a screen showing a list of types of mechanisms 20 is displayed on the display part 45. This list shows multiple types, such as a ball screw, a transmission belt, and a gear. It is assumed that data necessary for displaying the list is stored in advance in the data storage part 400. The user can specify any type. The specification receiving part 401 receives a specification for any type in the list based on a detection signal of the operation part 44.

Estimation Method Determination Part

The estimation method determination part 402 determines a method for estimating abnormality information based on the type of the mechanism 20 specified by the user. It is assumed that a relation between the type of the mechanism 20 and the method for estimating abnormality information is stored in advance in the data storage part 400. The estimation method determination part 402 determines, as an estimation method to be used in the industrial device 10, an estimation method associated with a type specified by the user among multiple estimation methods included in a list presented to the user. For example, the data storage part 400 stores data indicating an estimation method for a ball screw, data indicating an estimation method for a transmission belt, and data indicating an estimation method for a gear. The estimation method determination part 402 acquires data of an estimation method associated with a mechanism 20 specified by the user.

Estimation Result Output Part

An estimation result output part 403 outputs an estimation result of abnormality information. In the present embodiment, a case is described where the estimation result output part 403 uses a screen of the engineering tool to output an estimation result of abnormality information. However, it is also possible that the estimation result output part 403 uses another screen to output an estimation result of abnormality information, or uses a notification medium such as e-mail to output an estimation result of abnormality information. In addition, for example, without being limited to visual output using an image, the estimation result output part 403 may output an estimation result of abnormality information by auditory output using voice, or may output an estimation result of abnormality information by data output to a computer or an information storage medium.

FIG. 6 illustrates an example of how an estimation result of abnormality information is output on the screen of the engineering tool. For example, on the screen, a message indicating an abnormal phenomenon estimated by the abnormal phenomenon estimation part (106A) and a message indicating an abnormality cause estimated by the abnormality cause estimation part (106B) are displayed. On the screen, a probability that an abnormal phenomenon is estimated may be displayed. The message indicating the abnormality cause may include a link to a manual corresponding to the abnormality cause. In addition, for example, operation data at the time of occurrence of an abnormality may be displayed, or a manual corresponding to the abnormal phenomenon or the abnormality cause may be displayed. It is assumed that the manual is stored in advance in the data storage part 400.

Unit Phenomenon Output Part

A unit phenomenon output part 404 outputs an identification result of multiple unit phenomena in association with an estimation result of abnormality information. Outputting an estimation result of abnormality information and an identification result of unit phenomena in association with each other means outputting the results such that a correspondence relationship between the results can be understood. For example, the unit phenomenon output part 404 outputs an identification result of multiple unit phenomena on the same screen as an estimation result of abnormality information. For example, when an estimation result of abnormality information is selected, the unit phenomenon output part 404 outputs an identification result of multiple unit phenomena. In the example of FIG. 6, on the screen of the engineering tool, along with an abnormal phenomenon and an abnormality cause, unit phenomena on which estimations of the abnormal phenomenon and the abnormality cause are based are displayed.

Processing Executed by Abnormality Information Estimation System

Figure 7:
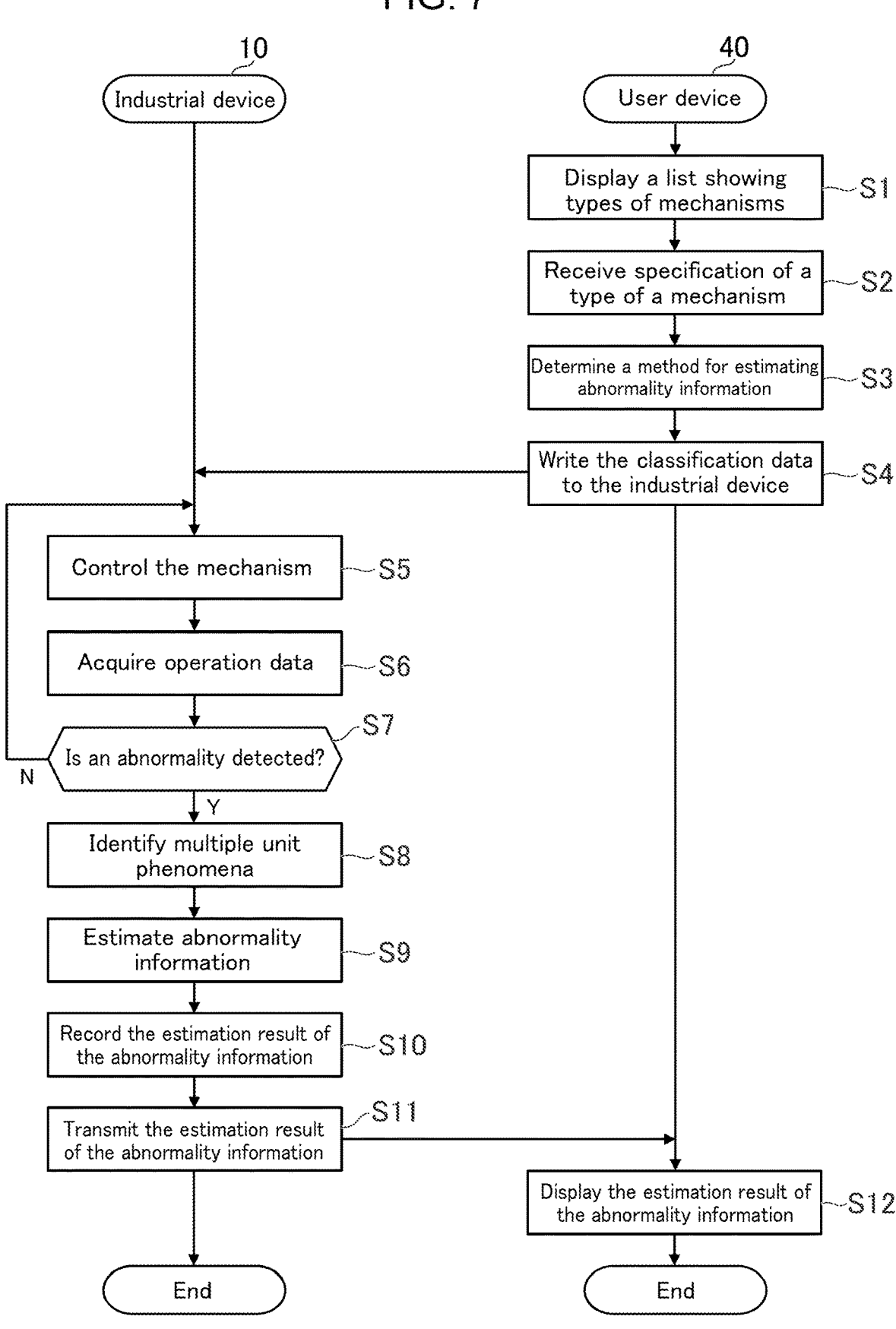
FIG. 7 is a flow diagram illustrating an example of processing executed by an abnormality information estimation system according to an embodiment of the present invention.

FIG. 7 is a flow diagram illustrating an example of processing executed by the abnormality information estimation system 1. The processing in FIG. 7 is executed by the CPUs (11, 41) that respectively operate according to the programs stored in the storage parts (12, 42). It is assumed that the user device 40 is connected to the industrial device 10 via a communication line.

As illustrated in FIG. 7, in the user device 40, the engineering tool is launched, and a list showing types of mechanisms 20 defined in the engineering tool is displayed on the display part 45 (S1). The user device 40 receives a specification of a type of a mechanism 20 by a user from the list (S2). The user device 40 determines an abnormality information estimation method based on the type of the mechanism 20 specified by the user (S3). The user device 40 writes classification data for estimating abnormality information to the industrial device 10 (S4). In S4, in addition to the classification data, data necessary for estimating abnormality information is also written.

The industrial device 10 controls the mechanism 20 based on an operation program and parameters stored in the storage part 12 (S5). The industrial device 10 acquires operation data based on a detection signal of the sensor 30 (S6). The industrial device 10 determines whether or not an abnormality has been detected based on the operation data acquired in S6 (S7). When it is not determined that an abnormality has been detected (S7: N), the process returns to S5 and the control of the mechanism 20 is continued.

When it is determined that an abnormality has been detected (S7: Y), the industrial device 10 identifies multiple unit phenomena based on the operation data acquired in S6 (S8). The industrial device 10 estimates abnormality information based on the estimation method written in S4 (S9). The industrial device 10 records the estimation result of the abnormality information estimated in S9 in the storage part 12 (S10). The industrial device 10 transmits the estimation result of the abnormality information recorded in S10 to the user device 40 at any timing (S11). Upon receiving the estimation result of the abnormality information, the user device 40 displays the abnormality information on the display part 45 (S12), and the process ends.

According to the abnormality information estimation system 1 of the present embodiment, since the operation data can contain various contents depending on conditions such as a control method and a command value of the industrial device 10, it is difficult to directly estimate the abnormality information from the operation data. In this regard, multiple unit phenomena included in an abnormal phenomenon can be identified from the operation data regardless of the conditions of the industrial device 10. Therefore, first, multiple unit phenomena are identified from the operation data, and abnormality information is estimated based on the multiple unit phenomena. Thereby, the estimation accuracy of the abnormality information is increased.

Further, the abnormality information estimation system 1 increases the estimation accuracy of an abnormal phenomenon by estimating the abnormal phenomena based on multiple unit phenomena.

Further, the abnormality information estimation system 1 increases the estimation accuracy of an abnormality cause by estimating the abnormality cause based on an abnormal phenomenon estimated based on multiple unit phenomena.

Further, the abnormality information estimation system 1 uses, as a method for identifying a unit phenomenon, an identification method that is independent of a mechanism 20 controlled by the industrial device 10, and thereby, can estimate a unit phenomenon in any mechanism 20. Therefore, the general versatility of the abnormality information estimation system 1 is increased. By using an estimation method that is dependent on the mechanism 20 as a method for estimating abnormality information, the abnormality information can be estimated using an estimation method specific to the mechanism 20. Therefore, the estimation accuracy of the abnormality information is increased.

Further, the abnormality information estimation system 1 estimates abnormality information based on an estimation method determined according to a mechanism 20 specified by a user, and thereby can estimate the abnormality information using an estimation method according to the mechanism 20, and the estimation accuracy of the abnormality information is increased. Further, it is also conceivable to estimate abnormality information using an estimation method for all types of mechanisms 20 and use only abnormality information according to a mechanism 20 that is actually controlled. However, in this case, since abnormality information of a mechanism 20 that is not actually controlled is also estimated, a processing load of the abnormality information estimation system 1 is increased. In this regard, since unnecessary abnormality information is not estimated, the processing load of the abnormality information estimation system 1 can be reduced.

Further, the abnormality information estimation system 1 not only outputs an estimation result of abnormality information, but also outputs multiple unit phenomena associated with the abnormality information, and thereby, can output information that is the basis for estimating the abnormality information, and thus, persuasiveness to users is increased.

Further, in the abnormality information estimation system 1, it is difficult to directly estimate abnormality information from the operation data. However, since individual unit phenomena can be identified using an analytical method, by identifying multiple unit phenomena that can be identified from the operation data and then estimating abnormality information, the estimation accuracy of the abnormality information is increased.

Further, in the abnormality information estimation system 1, it is difficult to directly estimate abnormality information from the operation data. However, since individual unit phenomena can be identified using a machine learning model, by identifying multiple unit phenomena and then estimating abnormality information, the estimation accuracy of the abnormality information is increased. By using a machine learning model, it is not necessary for a user to set a threshold, and thus, it is possible to reduce the work of the user.

Further, in the abnormality information estimation system 1, it is difficult to directly estimate abnormality information from the operation data. However, individual unit phenomena can be identified using a machine learning model by focusing on individual abnormality-occurring portions in the operation data. Therefore, by identifying unit phenomena by focusing on the abnormality-occurring portions and then estimating abnormality information, the estimation accuracy of the abnormality information is increased.

Further, in the abnormality information estimation system 1, by estimating abnormality information based on timings of occurrence of unit phenomena, abnormality information having a causal relationship with the timings of the unit phenomena can be estimated, and thus, the estimation accuracy of the abnormality information is increased.

Further, in the abnormality information estimation system 1, by estimating abnormality information based on sequential orders of unit phenomena, abnormality information having a causal relationship with the sequential orders of the unit phenomena can be estimated, and thus, the estimation accuracy of the abnormality information is increased.

Further, in the abnormality information estimation system 1, by estimating abnormality information based on time intervals of unit phenomena, abnormality information having a causal relationship with the time intervals of the unit phenomena can be estimated, and thus, the estimation accuracy of the abnormality information is increased.

Further, in the abnormality information estimation system 1, by estimating abnormality information based on features of physical quantities of portions corresponding to unit phenomena, abnormality information having a causal relationship with the feature quantities of the unit phenomenon can be estimated, and thus, the estimation accuracy of the abnormality information is increased.

Further, in the abnormality information estimation system 1, by identifying multiple unit phenomena based on multiple mutually different operation data sets, unit phenomena can be identified by comprehensively considering the multiple operation data sets, and thus, the identification accuracy of the unit phenomena and the estimation accuracy of the abnormality information are increased.

Further, in the abnormality information estimation system 1, when an abnormality has been detected, by identifying multiple unit phenomena, processing to estimate abnormality information is executed only when necessary, and a processing load of the industrial device 10 can be reduced.

MODIFIED EMBODIMENTS

The present disclosure is not limited to the embodiment described above. Appropriate modifications are possible within a scope without departing from the spirit of the present disclosure.

First Modified Embodiment

For example, the unit phenomenon identification part 105 may identify multiple unit phenomena based on setting information about settings of the industrial device 10. The setting information is information about settings used when the industrial device 10 controls the mechanism 20. For example, the setting information includes an operation program, parameters, firmware, or a combination thereof used when the industrial device 10 controls the mechanism 20. The setting information may be recorded in the industrial device 10 using the engineering tool, or may be recorded in advance in the industrial device 10. The setting information may be user-specifiable.

It is assumed that data related to a relation between the setting information and multiple unit phenomena is stored in advance in the data storage part 100. The data may be data for either an analytical method or a machine learning method. For example, the unit phenomenon identification part 105 uses the setting information as one of arguments in an analytical method. The unit phenomenon identification part 105 may determine a threshold used in an analytical method based on the setting information. For example, the unit phenomenon identification part 105 may input the setting information as one piece of information input to a machine learning model in a machine learning method. The machine learning model contains the setting information as one piece of information contained in training data.

The abnormality information estimation part 106 may estimate abnormality information based on the setting information of the industrial device 10. In this case, it is assumed that data related a relation between the setting information and the abnormality information is stored in advance in the data storage part 100. The data may be the classification data, or may be a machine learning model or a rule. For example, when a relation between the setting information and abnormality information is defined in the classification data, the abnormality information estimation part 106 estimates abnormality information associated with unit phenomena and the setting information. For example, the abnormality information estimation part 106 may input the setting information as one piece of information input to a machine learning model. The machine learning model contains the setting information as one piece of information contained in training data. In addition, for example, the abnormality information estimation part 106 may use the setting information as one of conditions in a rule.

According to the first modified embodiment, by identifying unit phenomena using the setting information, unit phenomena having a causal relationship with the setting information can be identified, and thus, the identification accuracy of the unit phenomena is increased.

Second Modified Embodiment

For example, in the abnormality information estimation system 1 described in the embodiment, the case is described where unit phenomena are identified based on an identification method that is independent of the type of the mechanism 20, and an abnormality cause is estimated based on an identification method that is dependent on the type of the mechanism 20. It is also possible that these features of the abnormality information estimation system 1 are used not in processing when an abnormality occurs, but in operation analysis other than an abnormality. In the second modified embodiment, an operation analysis system 2 having some functions of the abnormality information estimation system

1 is described. The operation analysis system 2 corresponds to a high-level concept of the abnormality information estimation system 1 in that it does not have to have other functions of the abnormality information estimation system 1. A hardware structure of the operation analysis system 2 is the same as that of the abnormality information estimation system 1, and is as illustrated in FIG. 1.

Figure 8:
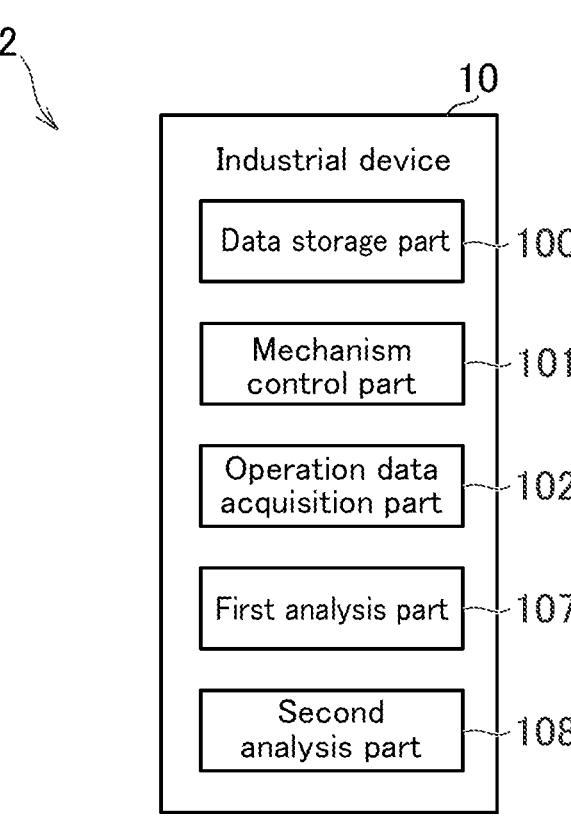
FIG. 8 illustrates an example of functional blocks of an operation analysis system according to a second modified embodiment of the present invention.

FIG. 8 illustrates an example of functional blocks of the operation analysis system 2 according to the second modified embodiment. A first analysis part 107 and a second analysis part 108 are mainly realized by the CPU 11. The first analysis part 107 corresponds to a high-level concept of the unit phenomenon identification part 105. The second analysis part 108 corresponds to a high-level concept of the abnormality information estimation part 106. Although the functions of the user device 40 are omitted in FIG. 8, the user device 40 may have functions similar to those in the embodiment. The user device 40 may output an analysis result of at least one of the first analysis part 107 and the second analysis part 108.

The first analysis part 107 analyzes an operation of the industrial device 10 based on operation data related to the operation of the industrial device 10 and based on multiple first analysis methods independent of the type of the mechanism 20 controlled by the industrial device 10. The analysis of the operation is not limited to an analysis related to an abnormality. For example, it may be an analysis of operation accuracy of the industrial device 10, an analysis of positioning accuracy of the mechanism 20, an analysis of quality of an object, an analysis of production efficiency of an object, or a combination of these. An analysis method that is independent of the type of the mechanism 20 is an analysis method that is the same regardless of the type of the mechanism 20. For example, when there are three types of mechanisms 20 such as a ball screw, a transmission belt, or a gear, the first analysis method is common to these three types. Regardless which one of these three types is controlled by the industrial device 10, the first analysis method is the same.

As the first analysis method, a method similar to the analytical method or the machine learning method described in the embodiment may be used. For example, the first analysis method may be a method for analyzing operation accuracy of the industrial device 10 using the k-neighborhood method or the cross-correlation coefficient, without depending on the type of the mechanism 20. The first analysis method may be a method using a machine learning model, in which a relation between a whole or a portion of the operation data and an analysis result is learned, without depending on the type of the mechanism 20. This point also applies to a second analysis method. However, the content analyzed by the first analysis method is independent of the type of the mechanism 20. For example, in the first analysis method, the content, such as the positioning accuracy of the motor, may be common regardless of the type of the mechanism 20. On the other hand, the content analyzed by the second analysis method is dependent on the type of the mechanism 20. For example, in the second analysis method, it is specific to the type of the mechanism 20, such as presence or absence of vibration of a table of a ball screw, accuracy of a speed of a transmission belt, or accuracy of a rotational position of a gear.

The second analysis part 108 analyzes an operation of the industrial device 10 based on analysis results of multiple first analysis methods and the second analysis method that is dependent on the type of the mechanism 20. An analysis method that is dependent on the type of the mechanism 20 is an analysis method that corresponds to the type of the mechanism 20. For example, when there are three types of mechanisms 20 such as a ball screw, a transmission belt, or a gear, the second analysis method is different to these three types. For example, the second analysis method may be different when the mechanism 20 is a ball screw, when the mechanism 20 is a transmission belt, and when the mechanism 20 is a gear. In this case, it is assumed that, for each type of mechanism 20, data indicating a second analysis method is stored in advance in the data storage part 100. The second analysis part 108 may analyze an operation of the industrial device 10 based on the second analysis method according to the type of the mechanism 20.

According to the second modified embodiment, based on analysis results based on multiple first analysis methods independent of the type of the mechanism 20 controlled by the industrial device 10, and based on the second analysis method dependent on the type of the mechanism 20, an operation can be analyzed and output, and thus, the general versatility of the operation analysis system 2 is increased and the accuracy of the operation analysis is increased.

OTHER MODIFIED EMBODIMENTS

For example, the industrial device 10 may estimate an abnormal phenomenon and an abnormality cause based on an estimation method for all types without the need for a user to specify the type of the mechanism 20. In this case, when connected to the user device 40, the industrial device 10 may transmit to the user device 40 only an estimation result corresponding to the type specified by the user. The user device 40 displays only the estimation result corresponding to the type specified by the user. An estimation result corresponding to a type not specified by the user may be deleted from the industrial device 10. In addition, for example, the industrial device 10 may estimate only an abnormal phenomenon without estimating an abnormality cause. Conversely, the industrial device 10 may estimate only an abnormality cause without estimating an abnormal phenomenon.

For example, the mechanism control part 101 described in the embodiment is an example of a motor control part. Therefore, based on operation data related to an operation of a motor, the unit phenomenon identification part 105 identifies multiple unit phenomena included in an abnormal phenomenon caused by the operation. Further, the abnormality information estimation part 106 estimates abnormality information related to an abnormality that has occurred in the mechanism 20 driven by the motor, based on multiple unit phenomena. The data storage part 100 stores an estimation result of the abnormality information. The data storage part 100 is an example of an estimation result storage part. For example, the industrial device 10 may be a device other than a motor control device, and when the industrial device 10 is a robot controller, a robot may correspond to the mechanism 20. A combination of the industrial device 10 and the mechanism 20 may be any combination.

For example, the functions may each be realized by any device in the abnormality information estimation system 1. Some or all of the functions described as being realized in the industrial device 10 may be realized in the user device 40 or other devices. In the embodiment, the case is described where the industrial device 10 estimates abnormality information. However, the function of estimating abnormality information may be realized in the user device 40 or in a controller that controls the industrial device 10.

For example, some or all of the functions described as being realized by the user device 40 may be realized in the industrial device 10 or other devices. For example, when the industrial device 10 includes an operation part that receives an operation of a user, the specification receiving part 401 and the estimation method determination part 402 may be realized by the industrial device 10. In addition, for example, when the industrial device 10 includes a display part for displaying a state of the industrial device 10, the estimation result output part 403 and the unit phenomenon output part 404 may be realized by the industrial device 10. In addition, for example, the functions described as being realized by the industrial device 10 or the user device 40 may be shared by multiple devices.

An abnormality information estimation system according to one aspect of the present invention includes: a unit phenomenon identification part that, based on operation data related to an operation of an industrial device that controls a mechanism, identifies multiple unit phenomena due to the operation; and an abnormality information estimation part that estimates abnormality information about an abnormality occurring in the mechanism based on the multiple unit phenomena.

According to an embodiment of the present invention, for example, estimation accuracy of abnormality information about an abnormality occurring in a mechanism controlled by an industrial device is increased.

Obviously, numerous modifications and variations of the present invention are possible in light of the above teachings. It is therefore to be understood that within the scope of the appended claims, the invention may be practiced otherwise than as specifically described herein.

What is claimed is:

1. An abnormality information estimation system, comprising:

processing circuitry configured to:

identify, based on operation data related to an operation of an industrial device that controls a mechanism, a plurality of unit phenomena due to the operation, the plurality of unit phenomena including mechanical characteristics of the industrial device, and estimate abnormality information about an abnormality occurring in the mechanism based on the plurality of unit phenomena, which includes the mechanical characteristics of the industrial device, wherein the processing circuitry is configured to estimate, based on the plurality of unit phenomena, which includes the mechanical characteristics of the industrial device, an abnormal phenomenon of the industrial device caused by the operation; and a display device configured to output a warning when the abnormal phenomenon of the industrial device is estimated by the processing circuitry identifying the abnormality occurring in the mechanism, wherein the processing circuitry is configured to estimate by applying machine learning model to analyze operation data by analyzing magnitudes, time-series variation, distribution, or a combination thereof, of numerical values contained in the operation data.

2. The abnormality information estimation system according to claim 1, wherein the processing circuitry is configured to estimate, based on the abnormal phenomenon, an abnormality cause, which is a cause of the abnormal phenomenon.

3. The abnormality information estimation system according to claim 1, wherein the processing circuitry is configured to identify the plurality of unit phenomena based on an identification method that is independent of a type of the mechanism, and estimate the abnormality information based on an estimation method that is dependent on the type of the mechanism.

4. The abnormality information estimation system according to claim 3, wherein the processing circuitry is configured to receive a specification of the type of the mechanism, determine the estimation method based on the type of the mechanism specified, and estimate the abnormality information based on the estimation method determined.

5. The abnormality information estimation system according to claim 1, wherein the processing circuitry is configured to output an estimation result of the abnormality information, and output an identification result of the plurality of unit phenomena in association with the estimation result of the abnormality information.

6. The abnormality information estimation system according to claim 1, wherein the processing circuitry is configured to identify at least one of the unit phenomena by analyzing the operation data based on an analytical method.

7. The abnormality information estimation system according to claim 1, wherein the processing circuitry is configured to identify at least one of the unit phenomena based on a machine learning model that estimates the at least one of the unit phenomena.

8. The abnormality information estimation system according to claim 7, wherein the processing circuitry is configured to extract a plurality of abnormality-occurring portions from the operation data, and identify at least one of the unit phenomena based on the plurality of abnormality-occurring portions and the machine learning model.

9. The abnormality information estimation system according to claim 1, wherein the processing circuitry is configured to identify timings of occurrence of the plurality of unit phenomena, and estimate the abnormality information based on the timings.

10. The abnormality information estimation system according to claim 1, wherein the processing circuitry is configured to identify sequential orders of the plurality of unit phenomena, and estimate the abnormality information based on the sequential orders.

11. The abnormality information estimation system according to claim 1, wherein the processing circuitry is configured to calculate time intervals of the plurality of unit phenomena, and estimate the abnormality information based on the time intervals.

12. The abnormality information estimation system according to claim 1, wherein the processing circuitry is configured to extract feature quantities related to portions of the operation data corresponding to the plurality of unit phenomena, and estimate the abnormality information based on the feature quantities.

13. The abnormality information estimation system according to claim 1, wherein the processing circuitry is configured to identify the plurality of unit phenomena based on a plurality of mutually different operation data sets in the operation data.

14. The abnormality information estimation system according to claim 1, wherein the processing circuitry is configured to detect occurrence of the abnormality based on the operation data, and identify the plurality of unit phenomena when occurrence of the abnormality is detected.

15. The abnormality information estimation system according to claim 1, wherein the processing circuitry is configured to identify the plurality of unit phenomena based on setting information about settings of the industrial device.

16. An operation analysis system, comprising:
processing circuitry configured to:
first analyze an operation of an industrial device, based on operation data relating to the operation of the industrial device such that the operation is based on a plurality of first analysis methods performed independent of a type of a mechanism controlled by the industrial device, and
second analyze the operation of the industrial device based on results of the first analyze using the plurality of first analysis methods and based on a second analysis method that is dependent on the type of the mechanism controlled by the industrial device; and
a display device configured to output a warning when the second analyze determines that the industrial device is in abnormal operation,
wherein the processing circuitry is configured to first analyze and second analyze by applying machine learning model to analyze operation data by analyzing magnitudes, time-series variation, distribution, or a combination thereof, of numerical values contained in the operation data.

17. A motor control device, comprising:
a controller comprising circuitry configured to control a motor;
processing circuitry configured to
identify, based on operation data related to an operation of the motor, a plurality of unit phenomena in an abnormal phenomenon caused by the operation, the plurality of unit phenomena including mechanical characteristics of an industrial device,
estimate abnormality information about an abnormality occurring in a mechanism driven by the motor based on the plurality of unit phenomena, which includes the mechanical characteristics of the industrial device, and
store, in a memory, an estimation result of the abnormality information; and
a display device configured to output a warning when the abnormality is estimated by the processing circuitry identifying the abnormality occurring in the mechanism,
wherein the processing circuitry is configured to estimate by applying machine learning model to analyze operation data by analyzing magnitudes, time-series variation, distribution, or a combination thereof, of numerical values contained in the operation data.

18. An abnormality information estimation method, comprising:
identifying, by processing circuitry, a plurality of unit phenomena in an abnormal phenomenon caused by an operation of an industrial device that controls a mechanism based on operation data related to the operation, the plurality of unit phenomena including mechanical characteristics of the industrial device;
estimating, by the processing circuitry, abnormality information about an abnormality occurring in the mechanism based on the plurality of unit phenomena, which includes the mechanical characteristics of the industrial device;
outputting, via a display device, a warning when the abnormal phenomenon is estimated by the processing circuitry identifying the abnormality occurring in the mechanism,
wherein the processing circuitry is configured to estimate by applying machine learning model to analyze operation data by analyzing magnitudes, time-series variation, distribution, or a combination thereof, of numerical values contained in the operation data.

19. A non-transitory computer-readable storage medium including computer executable instructions, wherein the instructions, when executed by a computer, cause the computer to perform the method of claim 18.

* * * * *